(12) United States Patent
Porcs et al.

(10) Patent No.: US 10,315,561 B2
(45) Date of Patent: Jun. 11, 2019

(54) CUP HOLDER ASSEMBLIES HAVING LIGHT EMITTING ASSEMBLIES FOR CONSOLE ASSEMBLIES OF VEHICLES

(71) Applicant: Toyota Motor Engineering & Manufacturing North America, Inc., Erlanger, KY (US)

(72) Inventors: Robert A. Porcs, Saline, MI (US); Chae An, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 37 days.

(21) Appl. No.: 15/653,951

(22) Filed: Jul. 19, 2017

(65) Prior Publication Data
US 2019/0023179 A1    Jan. 24, 2019

(51) Int. Cl.
| | |
|---|---|
| *B60Q 3/20* | (2017.01) |
| *B60N 3/10* | (2006.01) |
| *B60Q 3/64* | (2017.01) |
| *B60R 7/04* | (2006.01) |

(Continued)

(52) U.S. Cl.
CPC ............ *B60Q 3/20* (2017.02); *B60N 3/101* (2013.01); *B60N 3/108* (2013.01); *B60Q 3/64* (2017.02); *A47G 23/0309* (2013.01); *B60R 7/04* (2013.01); *F21Y 2115/10* (2016.08)

(58) Field of Classification Search
CPC . B60Q 3/20; B60Q 3/64; B60Q 3/225; B60Q 3/78; B60N 3/10; Y10S 224/926
See application file for complete search history.

(56) References Cited

U.S. PATENT DOCUMENTS

| | | | | |
|---|---|---|---|---|
| 5,915,832 A | * | 6/1999 | Baird, Sr. | .......... A47G 23/0216 |
| | | | | 362/101 |
| 7,322,500 B2 | * | 1/2008 | Maierholzner | ........ B60N 3/102 |
| | | | | 15/236.02 |
| 8,485,680 B2 | | 7/2013 | Anderson et al. | |

(Continued)

FOREIGN PATENT DOCUMENTS

| | | |
|---|---|---|
| DE | 102015114690 A1 | 3/2016 |
| JP | 2007203800 A | 8/2007 |

(Continued)

OTHER PUBLICATIONS

"Center console cup holder accent lighting", published/accessed Oct. 26, 2013; URL: http://www.toyotanation.com/forum/310-camry-7th-generation-2012/623794-diy-center-console-cup-holder-accent-lighting.html.

*Primary Examiner* — Bradley Duckworth
(74) *Attorney, Agent, or Firm* — Dinsmore & Shohl LLP (57) ABSTRACT

A cup holder assembly for a console assembly of a vehicle includes a cover, a housing, a light source, a support frame, and a light emitting assembly. The cover includes an exterior surface, an opposite interior surface, and an opening extending between the exterior surface and the interior surface. The housing includes an open ended receptacle. The housing is connected to the interior surface of the cover such that the opening permits access to the open ended receptacle. The support frame is connected to at least one of the cover and the housing. The light emitting assembly is positioned between the interior surface of the cover and the support frame. The light emitting assembly is oriented to emit light outwardly away from the exterior surface of the cover.

20 Claims, 7 Drawing Sheets

(51) Int. Cl.
*A47G 23/03* (2006.01)
*F21Y 115/10* (2016.01)

(56) References Cited

U.S. PATENT DOCUMENTS

| | | | |
|---|---|---|---|
| 9,266,468 B2 | 2/2016 | Mizushiro et al. | |
| 9,381,843 B2* | 7/2016 | Muiter | B60N 3/108 |
| 9,440,584 B2* | 9/2016 | Salter | B60Q 3/64 |
| 9,751,460 B1* | 9/2017 | Iordache | B60Q 3/64 |
| 10,042,107 B2* | 8/2018 | Okabe | B60Q 3/64 |
| 2008/0266853 A1* | 10/2008 | Goto | G02B 6/0006 |
| | | | 362/240 |
| 2015/0062968 A1* | 3/2015 | Shiraishi | G02B 6/0011 |
| | | | 362/628 |
| 2017/0182937 A1* | 6/2017 | Takahama | B60N 3/10 |

FOREIGN PATENT DOCUMENTS

| | | |
|---|---|---|
| JP | 2014091399 A | 5/2014 |
| KR | 20120118930 A | 10/2012 |
| KR | 101421929 B1 | 7/2014 |

\* cited by examiner

CUP HOLDER ASSEMBLIES HAVING LIGHT EMITTING ASSEMBLIES FOR CONSOLE ASSEMBLIES OF VEHICLES

TECHNICAL FIELD

The present specification generally relates to cup holder assemblies for console assemblies of vehicles and, more specifically, to cup holder assemblies having light emitting assemblies.

BACKGROUND

Passenger compartments of vehicles may be equipped with console assemblies having cup holder assemblies located between a driver's seat and a front passenger's seat. The cup holder assemblies include cup holders configured to receive an object such as a cup or other beverage container.

Increasingly, vehicles are provided different interior packages. For example, vehicles typically include a lighting package in which lighting features are provided within the passenger compartment. In a vehicle with the lighting package, the cup holder assemblies often include a lighting feature to illuminate an interior of a cup holder. However, an exterior of the cup holder assemblies are not illuminated by the light feature package.

Accordingly, there is a need for cup holder assemblies of console assemblies capable of illuminating an exterior of the cup holder assemblies and which can be used without the lighting package while avoiding a user from noticing the absence of the lighting feature package.

SUMMARY

In accordance with one embodiment, a cup holder assembly for a console assembly of a vehicle is provided. The cup holder assembly includes a cover, a housing, a support frame, and a light emitting assembly. The cover includes an exterior surface, an opposite interior surface, and an opening extending between the exterior surface and the interior surface. The housing includes an open ended receptacle. The housing is connected to the interior surface of the cover such that the opening permits access to the open ended receptacle. The support frame is connected to at least one of the cover and the housing. The light emitting assembly is positioned between the interior surface of the cover and the support frame. The light emitting assembly is oriented to emit light outwardly away from the exterior surface of the cover.

In accordance with another embodiment, a vehicle is provided. The vehicle includes a passenger compartment and console assembly. The console assembly includes a cup holder assembly within the passenger compartment. The cup holder assembly includes cover, a housing, a support frame, and a light emitting assembly. The cover includes an exterior surface, an opposite interior surface, and an opening extending between the exterior surface and the interior surface. The housing includes an open ended receptacle. The housing is connected to the interior surface of the cover such that the opening permits access to the open ended receptacle. The support frame is connected to at least one of the cover and the housing. The light emitting assembly is positioned between the interior surface of the cover and the support frame. The light emitting assembly is oriented to emit light outwardly away from the exterior surface of the cover.

In accordance with another embodiment, a method of illuminating an exterior of a cup holder assembly for a console assembly of a vehicle is provided. The method includes providing a cover, a housing, a support frame, and a light emitting assembly. The cover includes an exterior surface, an opposite interior surface, and an opening extending between the exterior surface and the interior surface. The housing includes an open ended receptacle. The housing is connected to the interior surface of the cover such that the opening permits access to the open ended receptacle. The support frame is connected to at least one of the cover and the housing. The light emitting assembly is positioned between the interior surface of the cover and the support frame. The light emitting assembly is oriented to emit light outwardly away from the exterior surface of the cover.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Vehicles according to the present specification include a passenger compartment having an instrument panel and at least two seats, a driver seat and a front passenger seat. Between the driver seat and the passenger seat, and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly includes a cup holder assembly. The cup holder assembly includes a cover, a housing, a support frame, and a light emitting assembly. The cover includes an exterior surface, an opposite interior surface, and an opening extending between the exterior surface and the interior surface. The housing includes an open ended receptacle. The housing is connected to the interior surface of the cover such that the opening permits access to the open ended receptacle. The support frame is connected to at least one of the cover and the housing. The light emitting assembly is positioned between the interior surface of the cover and the support frame. The light emitting assembly is oriented to emit light outwardly away from the exterior surface of the cover.

In some embodiments, the cup holder assembly may include a pair of side curtain walls. Each of the side curtain walls includes an inner surface and an opposite outer surface. At least a portion of the housing may be positioned between the inner surfaces of the pair of side curtain walls. The light emitting assembly may be oriented to emit light away from the outer surface of the side curtain walls.

The embodiments disclosed herein may be configured to allow for a cup holder assembly to be used in vehicles with or without a lighting feature. In vehicles without the lighting feature, the cup holder assembly prevents a user from noticing the absence of the lighting feature. Specifically, in vehicles with the lighting feature, the cup holder assembly may be provided with the light emitting assembly to illuminate the exterior of the cup holder assembly, and in vehicles without the lighting feature, the cup holder assembly may not be provided with the light emitting assembly. In some embodiments, the cup holder assembly may not be provided with either the support frame or the light emitting assembly in vehicles without the lighting feature.

As the light emitting assembly is positioned below the interior surface of the cover, the appearance of the cup holder assembly without the light emitting assembly is unnoticeable to a user. As the outwardly appearance of the cup holder assembly is the same with or without the light emitting assembly, the cup holder assembly can be used in vehicles with and without the lighting feature.

In some embodiments, the light emitting assembly includes a first light emitting assembly and a second light emitting assembly. The first light emitting assembly includes a first light emitting element and a first light source. The second light emitting assembly includes a second light emitting element and a second light source.

The first light emitting element includes a first light receiving face and a first light emitting face. The first light receiving face may be positioned to receive light emitted from the first light source. The first light emitting face may be configured to emit light received from the first light receiving face outwardly away from the outer surface of one of the pair of side curtain walls.

The second light emitting element includes a second light receiving face and a second light emitting face. The second light receiving face may be positioned to receive light emitted from the second light source. The second light emitting face may be configured to emit light received from the second light receiving face away from the outer surface of the other of the pair of side curtain walls.

In some embodiments, the cover may include a first lip and an opposite second lip, and the support frame may include a first side edge and an opposite second side edge. The first light emitting element may be positioned between the first side edge of the support frame and the first lip of the cover such that the first light emitting face emits light outwardly away from the first side edge of the support frame and the first lip of the cover. The second light emitting element is positioned between the second side edge of the support frame and the second lip of the cover such that the second light emitting face emits light outwardly away from the second side edge of the support frame and the second lip of the cover.

The embodiments disclosed herein may also be configured to retain the installation of the first light emitting element and the second light emitting element onto the support frame of the cup holder assembly. As the first light emitting element is positioned between the first side edge of the support frame and the first lip of the cover and the second lighting element is positioned between the second side edge of the support frame and the second lip of the cover, upon connection of the support frame to the at least one of the cover and the housing, the first light emitting element and the second light emitting element are retained between the cover and the support frame. As such, an entire of the first light emitting face and the second light emitting face may be continuously exposed between cover and the support frame without interruption.

Various embodiments of the cup holder assembly of the console assembly for the passenger compartment of the vehicle will be described in more detail herein.

It should be appreciated that the cup holder assembly of the console assembly may be provided at any suitable position within a vehicle, such as between a pair of front row seats, a pair of second or third row rear seats, etc. The console assembly may be provided with an interior cavity utilized as a storage compartment. The console assembly may be provided within a center console of a vehicle as described above. While the embodiments described herein are described in reference to a console assembly having a cup holder assembly having a receptacle configured to receive an object such as a cup or other beverage container, the embodiments are not limited thereto. For example, in some embodiments, the receptacle of the cup holder assembly may include, without limitation, alternative vehicle accessories such as storage areas, ashtrays, electronic components, HVAC, and/or audio component controls, etc.

In some embodiments, the cup holder assembly is fixedly secured to the console assembly. However, the embodiments are not limited thereto. For example, in some embodiments, the cup holder assembly may be releasably attached to the console assembly for movement between console assemblies positioned between pairs of first row seats, second row seats, and third row seats of a vehicle.

Figure 1:
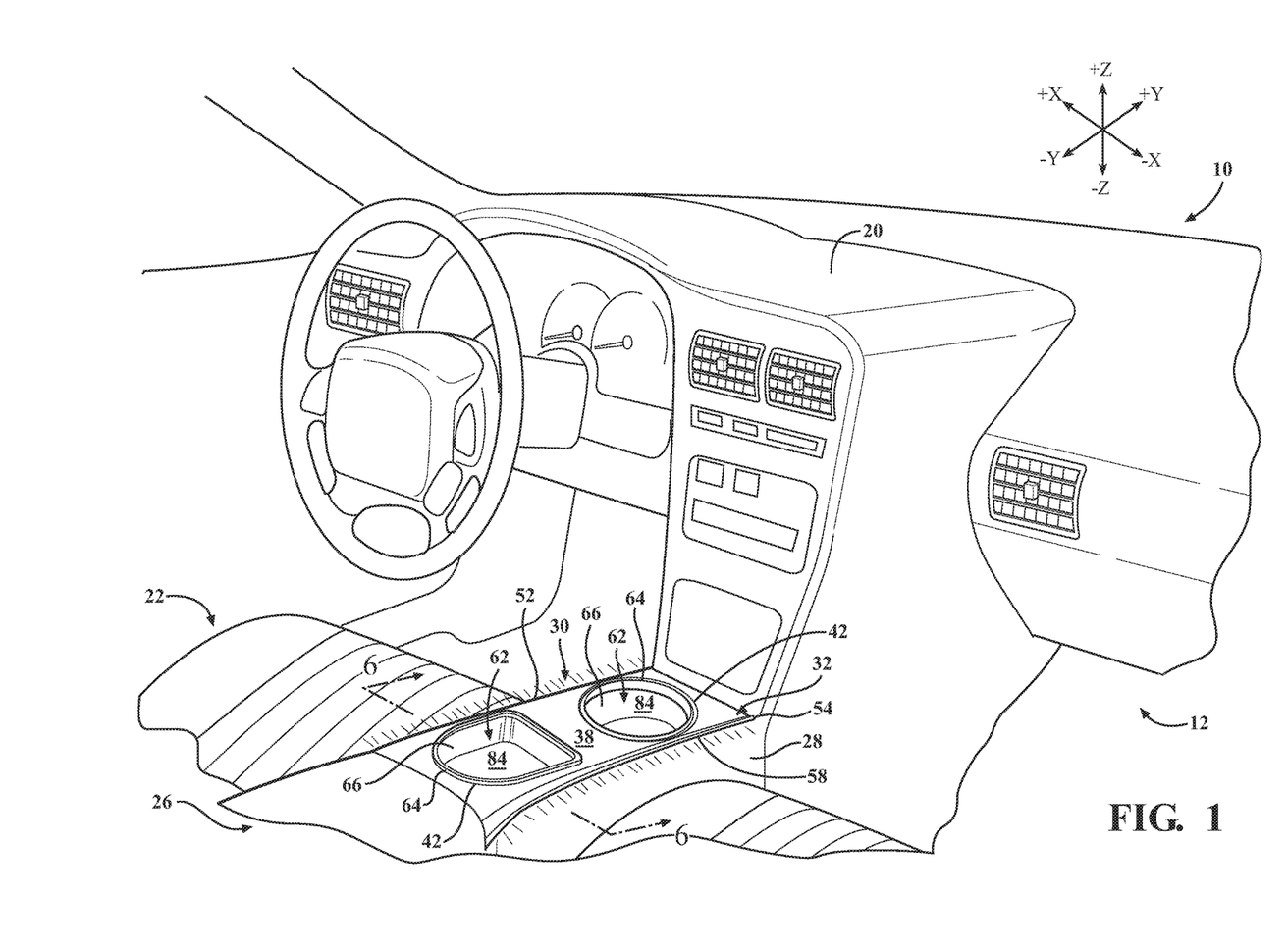
FIG. 1 schematically depicts a partial perspective view of a passenger compartment of a vehicle having a console assembly having a cup holder assembly with a light emitting assembly, according to one or more embodiments described and illustrated herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward" as used herein refers to the relative location of a component with respect to a vehicle centerline. The terms "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Referring initially to FIG. 1, a partial perspective view of a passenger compartment 12 of a vehicle 10 is depicted. The passenger compartment 12 includes a driver area and a passenger area.

An instrument panel 20 is provided within the passenger compartment 12. The instrument panel 20 generally extends in the vehicle lateral direction and includes, without limitation, an instrument cluster, a radio, and a climate control cluster including a plurality of individual vents. Further, the passenger compartment 12 includes a driver seat 22 and a front passenger seat 24. Located adjacent the driver seat 22 is the controls to the vehicle 10 such as, without limitation, a steering wheel, a gas pedal, and a brake pedal. It should be appreciated that the passenger compartment 12 may include a plurality of passenger seats rearward of the front passenger seat 24 in the vehicle longitudinal direction.

Generally, between the driver seat 22 and the front passenger seat 24 is a console assembly 26. The console assembly 26 generally extends in the vehicle longitudinal direction extending from the instrument panel 20 ending at or slightly beyond a rear surface of the driver seat 22 and the front passenger seat 24. Further, the console assembly 26 generally extends in the vehicle lateral direction an equal distance outwardly from a vehicle centerline, limited in width by the distance between the driver seat 22 and the front passenger seat 24. The console assembly 26 includes a pair of side curtain walls 28. Each of the pair of side curtain walls 28 includes an outer surface 28A and an opposite inner surface 28B. The outer surface 28A of the pair of side curtain walls 28 is exposed to the passenger compartment 12 of the vehicle. In some embodiments, the side curtain walls 28 are formed as a part of the cup holder assembly 30.

The cup holder assembly 30 may be integrated with the console assembly 26. In some embodiments, the cup holder assembly 30 is integrated with the console assembly 26 and the instrument panel 20. In some other embodiments, the cup holder assembly 30 may be separated from the console assembly 26, the instrument panel 20, or both.

Figure 2:
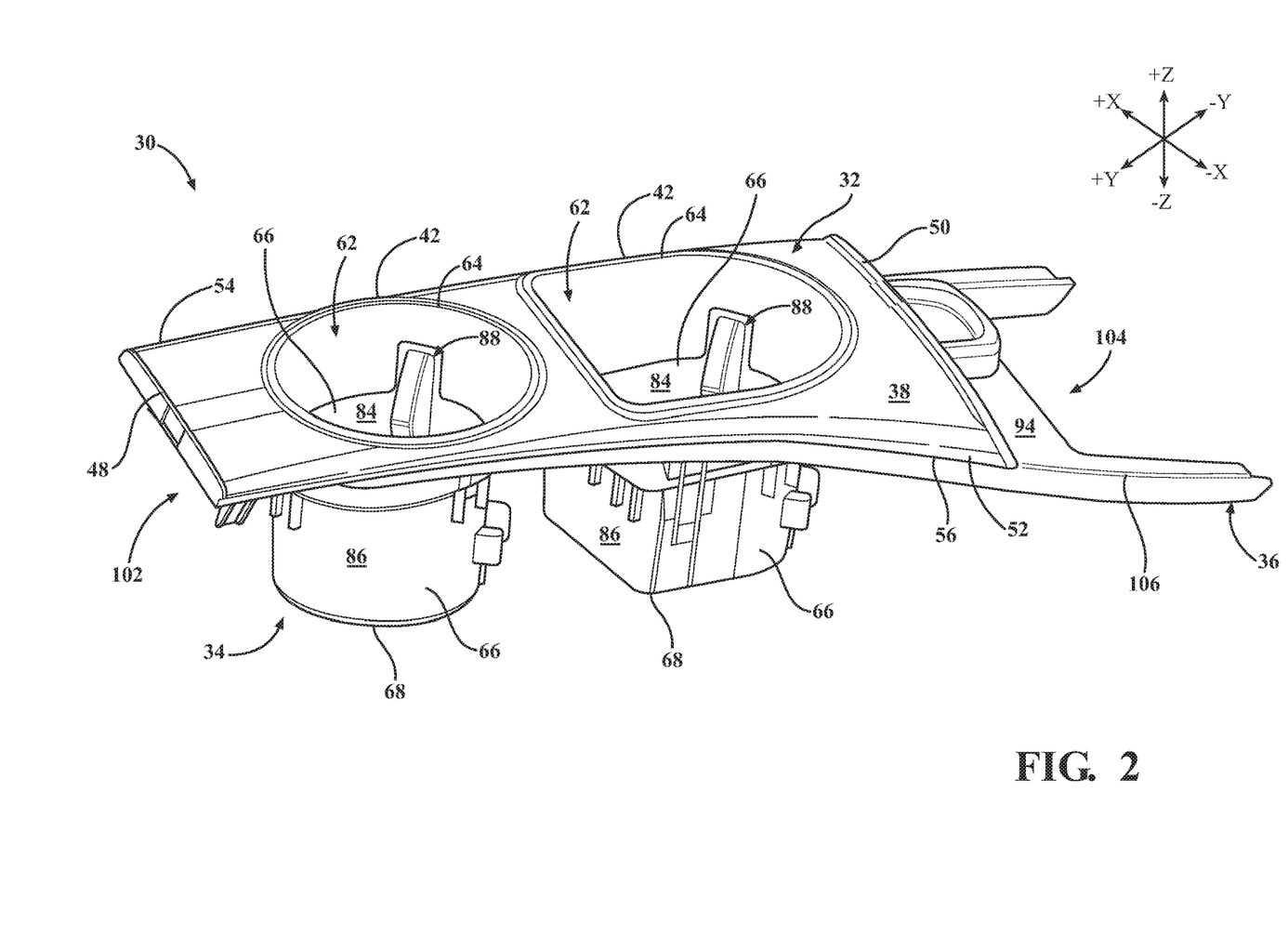
FIG. 2 schematically depicts a front perspective view of the cup holder assembly of the console assembly of FIG. 1 in isolation, according to one or more embodiments described and illustrated herein.
Figure 3:
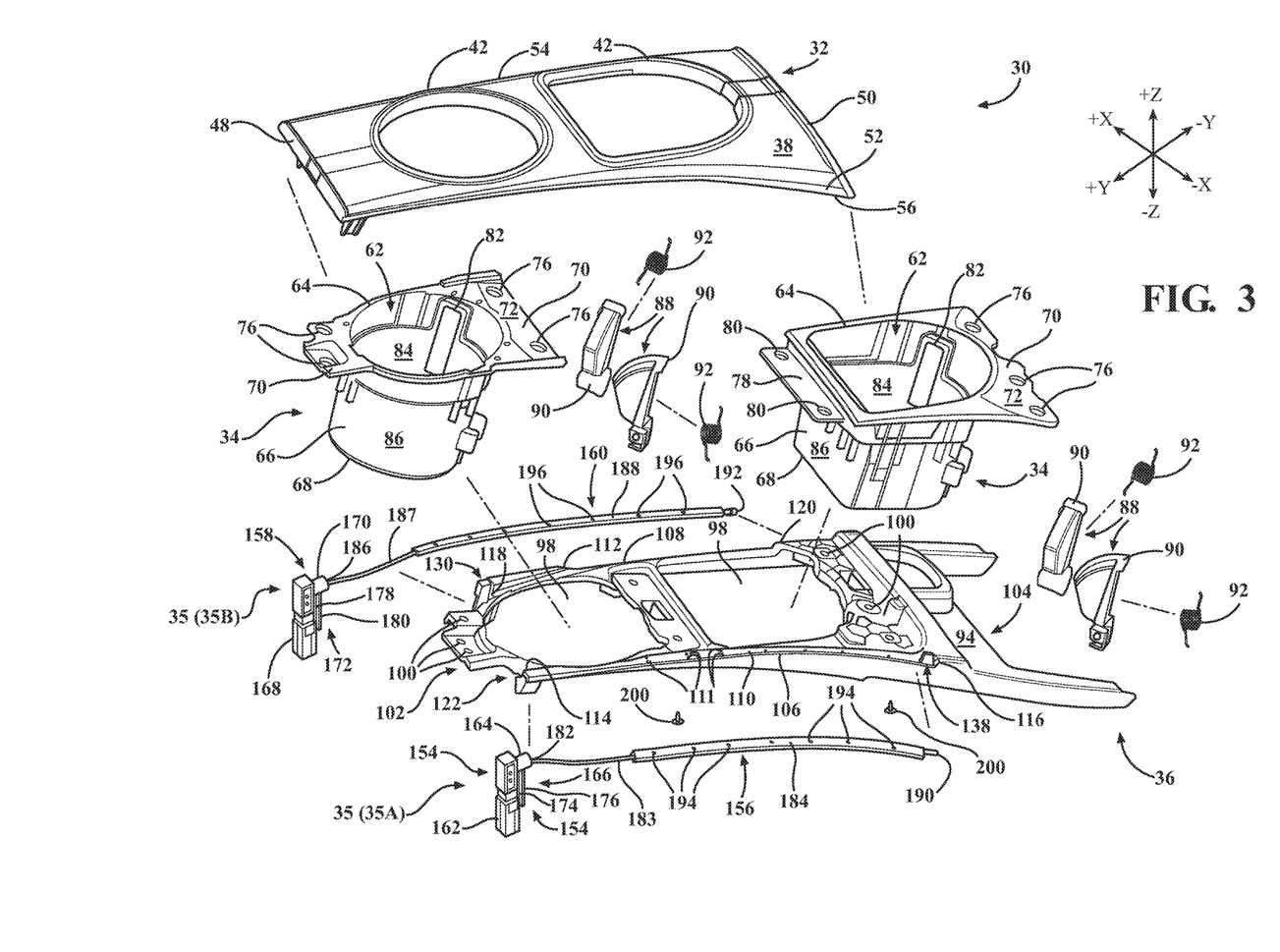
FIG. 3 schematically depicts an exploded view of the cup holder assembly of FIG. 2, according to one or more embodiments described and illustrated herein.

Referring to FIGS. 2 and 3, the cup holder assembly 30 includes a cover 32, a housing 34, a light emitting assembly 35, and a support frame 36. As will be described in greater detail below, the support frame 36 is connected to at least one of the cover 32 and the housing 34.

The cover 32 includes an exterior surface 38, an opposite interior surface 40, and a pair of openings 42. The exterior surface 38 is exposed to the passenger compartment 12 of the vehicle 10. The openings 42 extend between the exterior surface 38 and the interior surface 40 of the cover 32. The cover 32 may be provided with a single opening 42 or a pair of openings 42.

In some embodiments, the cover 32 and the housing 34 may be integrally formed as a one piece monolithic structure. Specifically, the cover 32 and the housing 34 may be integrally molded as a one piece monolithic structure.

Figure 6:
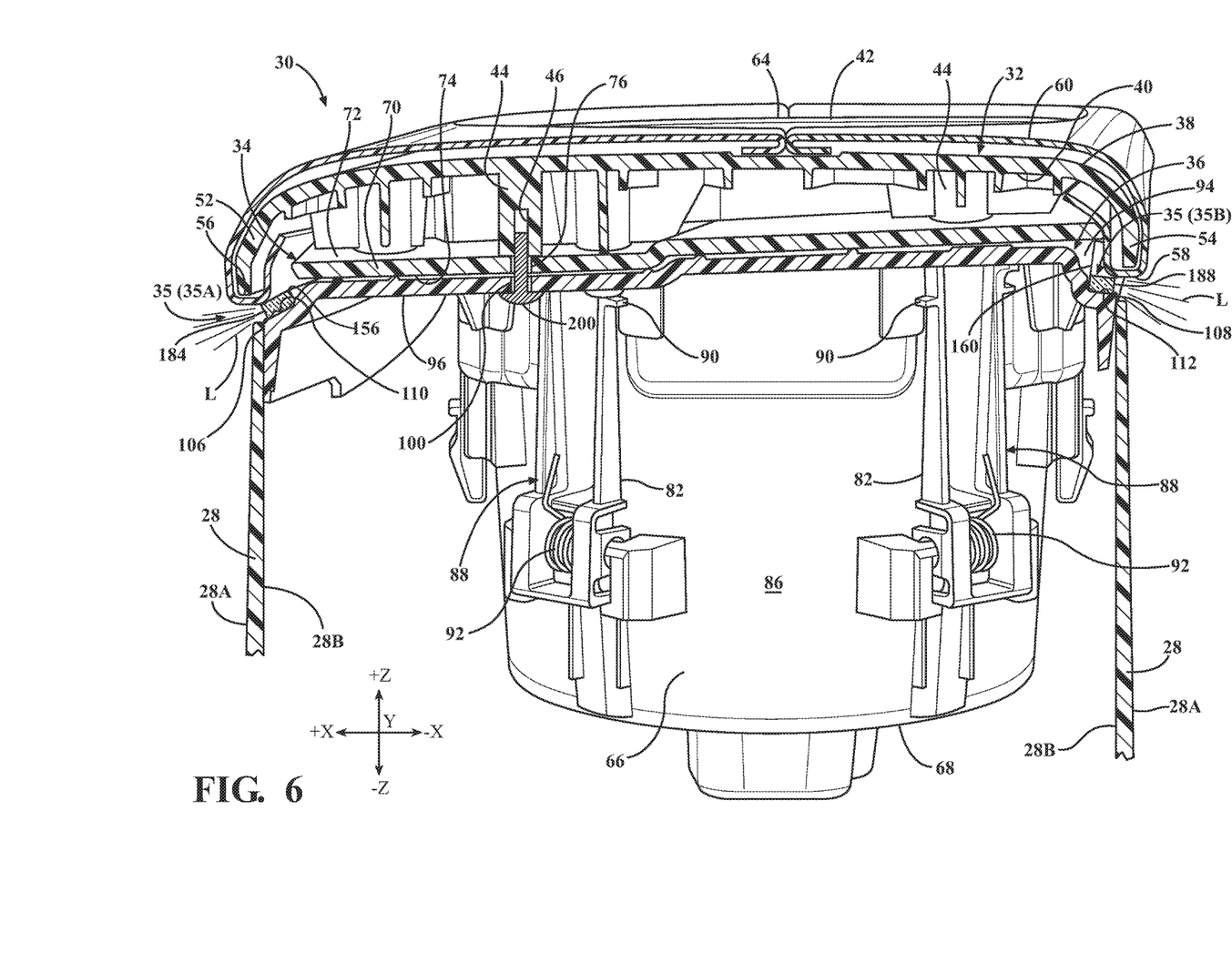
FIG. 6 schematically depicts a cross section of a rear view of the cup holder assembly of FIG. 1 taken along line 6-6, according to one or more embodiments described and illustrated herein.

With reference to FIG. 6, the cover may also include connection posts 44 that extend downwardly in the vehicle vertical direction. The connection posts 44 include internal bores 46 that may include interior threads.

In some embodiments, at least a portion of the cup holder assembly 30 is positioned at least partially between the pair of side curtain walls 28. Specifically, at least a portion of the cup holder assembly 30 is positioned between the inner surfaces 28B of the pair of side curtain walls 28 such that the cover 32, specifically the exterior surface 38, is exposed to the passenger compartment 12 of the vehicle 10.

With reference to FIGS. 2, 3, and 6, the cover 32 may also include a front end 48 and an opposite rear end 50. In some embodiments, the front end 48 may be provided forward in the vehicle longitudinal direction and the rear end 50 may be provided rearward in the vehicle longitudinal direction. It is appreciated, of course, that the front end 48 and the rear end 50 are not limited to being provided forward and rearward, respectively, in the vehicle longitudinal direction.

The cover 32 may also include a first lip 52 and the second lip 54. The first lip 52 and the second lip 54 may extend between the front end 48 and the rear end 50. The first lip 52 may include a first distal edge 56 and the second lip 54 may include a second distal end 58. The first distal edge 56 of the first lip 52 and the second distal end 58 of the second lip 54 form side edges of the cover 32. The first distal edge 56 and the second distal end 58 traverse between the exterior surface 38 and the interior surface 40 of the cover 32. The first lip 52 and the second lip 54 may be curved such that the first lip 52 and the second lip 54 extend generally normal from a remainder of the cover 32.

In some embodiments, the first lip 52 and the second lip 54 may be configured such that the first distal edge 56 and the second distal end 58 are the lowermost portions of the cover 32. Specifically, the first distal edge 56 and the second distal end 58 may be positioned below the interior surface 40 of the cover in the vehicle vertical direction.

In some embodiments, the cover 32 may include a wrap 60. The wrap 60 covers the exterior surface 38 of the cover 32. The wrap 60 may wrap around the first distal edge 56 and the second distal end 58 such that the wrap 60 covers a portion of the interior surface 40 of the cover 32. The wrap 60 may be formed of a soft cover material having an aesthetically appearance, illustratively including but not limited to, leather or vinyl. It is appreciated, of course, that wrap 60 includes openings that correspond to the openings 42 of the cover 32.

With reference FIGS. 2, 3, and 6, the housing 34 includes a pair of open ended receptacles 62. The open ended receptacles 62 define interior storage spaces therein which receive and retain objects, such as cups or other beverage containers. The open ended receptacles 62 are similarly constructed. Each of the open ended receptacles 62 includes an upper edge 64. The open ended receptacles 62 are defined by the upper edges 64, at least one sidewall 66, and a floor 68. The sidewall 66 extends between the upper edge 64 and the floor 68. The upper edges 64 define open ends of the open ended receptacles 62. The open ends of the open ended receptacles 62 correspond to the openings 42 in the cover 32 to permit access into the open ended receptacles 62.

A flange 70 extends outwardly from the upper edge 64 of the open ended receptacles 62. The flange 70 includes an upper surface 72 and an opposite lower surface 74, and a plurality of bores 76. The plurality of bores 76 extend between the upper surface 72 and the lower surface 74 of the flange 70. The plurality of bores 76 are positioned to correspond to the connection posts 44 of the cover 32. As will be described in greater detail below, the upper surface 72 of the flange 70 faces the interior surface 40 of the cover 32.

As shown in FIG. 3, the housing 34 may be formed of a pair of housings 34. In some embodiments, the pair of housings 34 may be integrally formed as a one piece monolithic structure. In some other embodiments, one of the pair of housings 34 includes an attachment flange 78. The attachment flange 78 may include a pair of attachment bores 80 that correspond to the bores 76 on the other of the pair of housings 34.

Each of the sidewalls 66 of the open ended receptacles 62 includes a pair of apertures 82. Each of the apertures 82 are formed so as to extend between an inner surface 84 of the sidewall 66 and an opposite outer surface 86 of the sidewall 66. The apertures 82 may be provided on the rearward side, in the vehicle longitudinal direction, of the sidewall 66. Each of the apertures 82 is configured to receive a retention finger 88. The retention fingers 88 include a shoulder 90 that may contact the outer surface 86 of the sidewall 66 while a remaining portion of the retention finger 88 extends through the apertures 82 to extend at least partially into the interior storage area of the open ended receptacles 62.

In some embodiments, a biasing member 92 may be provided on each of the retention fingers 88 to bias the retention fingers 88 from a retracted position towards an extended position. In the extended position the retention fingers 88 extend farther into the interior storage area of the open ended receptacles 62 than in the retracted position. The biasing of the retention fingers 88 towards the extended position, allows objects positioned within the interior storage area of the open ended receptacles 62 to be retained therein.

Figure 4A:
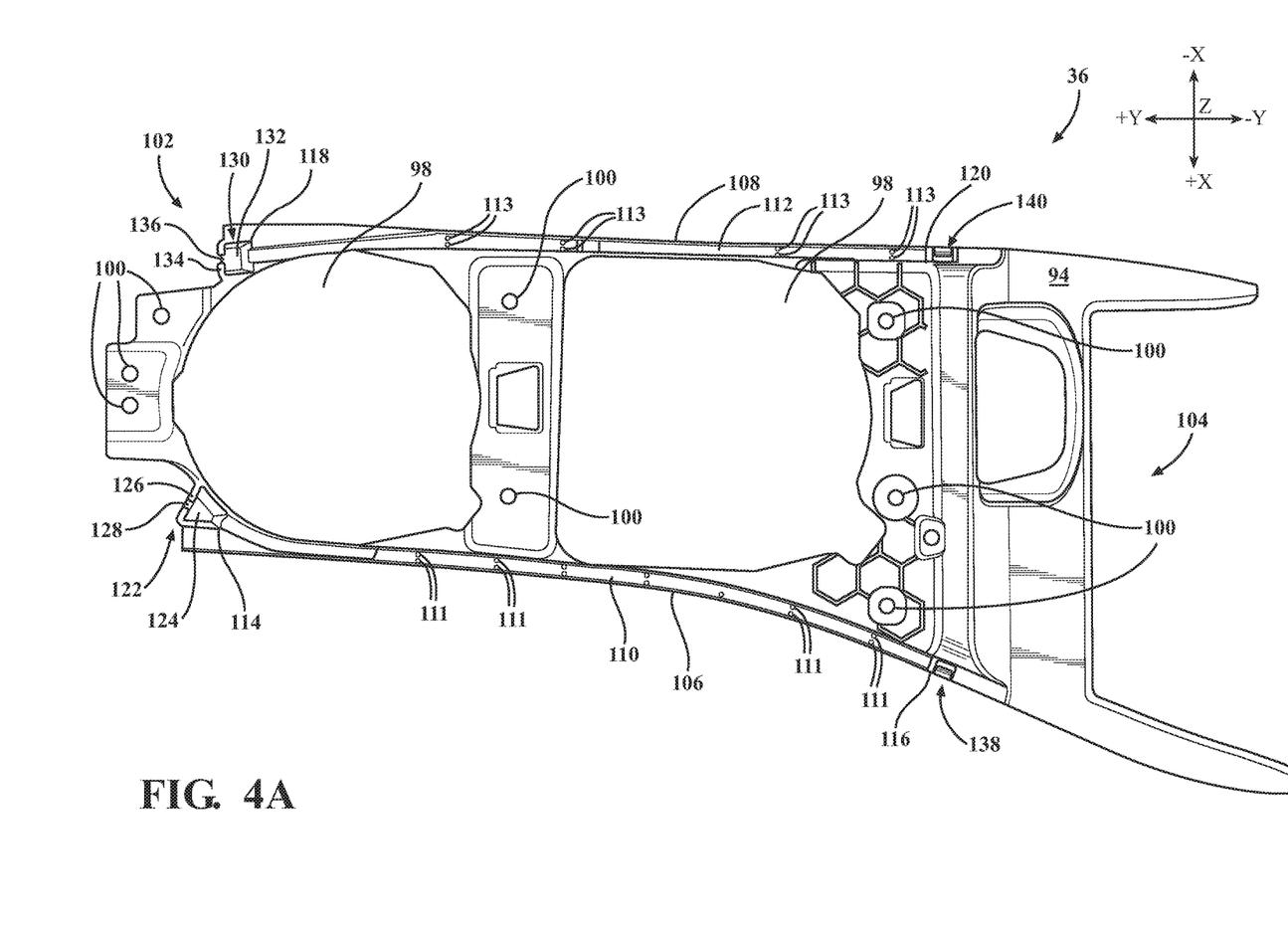
FIG. 4A schematically depicts a top view of a support frame, without the light emitting assembly, of the cup holder assembly of the console assembly of FIG. 3 in isolation, according to one or more embodiments described and illustrated herein.
Figure 4B:
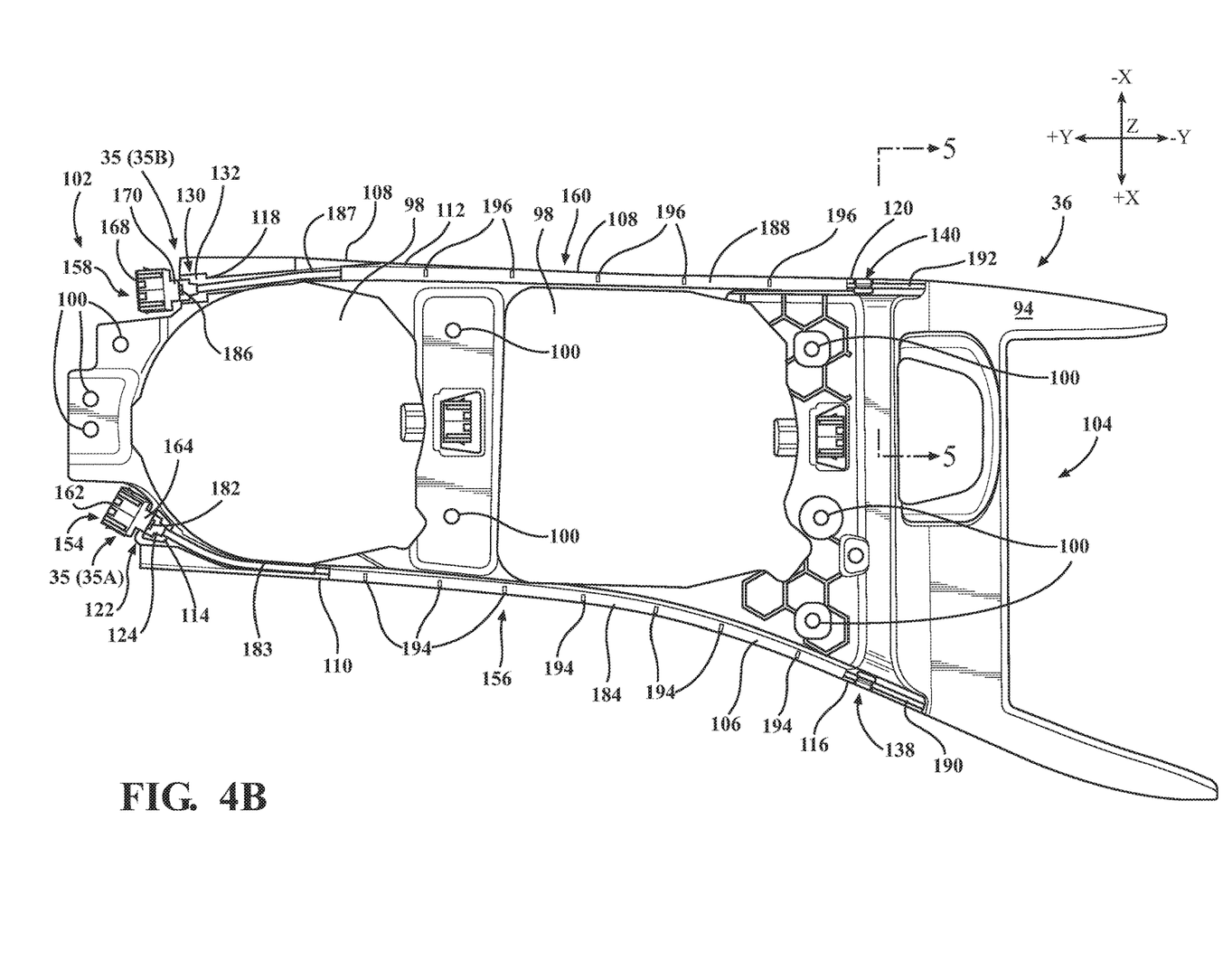
FIG. 4B schematically depicts a top view of a support frame, with the light emitting assembly, of the cup holder assembly of the console assembly of FIG. 3 in isolation, according to one or more embodiments described and illustrated herein.

Referring to FIGS. 3 and 4A-4B, the support frame 36 includes an upper surface 94, an opposite lower surface 96, and a pair of apertures 98. Each of the pair of apertures 98 extend between the upper surface 94 and the lower surface 96. As will be described in greater detail below, the pair of apertures 98 correspond in shape to the shape of the open ended receptacles 62.

The support frame 36 may include holes 100 that correspond to the bores 76 of the housings 34 and the attachment bores 80 provided on the attachment flange 78. As will be described in greater detail below, the support frame 36 may be connected to at least one of the cover 32 and the housing 34 by fasteners 200 that extend through the holes 100, the bores 76, the attachment bores 80, and into the internal bores 46 of the connection posts 44 of the cover 32. In some embodiments, the support frame 36 and the housings 34 are attached to the cover 32 by heat staking, ultrasonic welding, or adhesives.

The support frame 36 may further include a first end portion 102 and an opposite second end portion 104. In some embodiments, the first end portion 102 may be provided forward in the vehicle longitudinal direction and the second end portion 104 may be provided rearward in the vehicle longitudinal direction. It is appreciated, of course, that the first end portion 102 and the second end portion 104 are not limited to being provided forward and rearward, respectively, in the vehicle longitudinal direction.

The support frame 36 may also include a first side edge 106 and an opposite second side edge 108. The first side edge 106 and the second side edge 108 between the first end portion 102 and the second end portion 104 of the support frame 36. The support frame 36 may further include a first groove 110 and a second groove 112.

The first groove 110 extends along the support frame 36 adjacent the first side edge 106 from the first end portion 102 towards the second end portion 104. The second groove 112 extends along the support frame 36 adjacent the second 108 side edge from the first end portion 102 towards the second end portion 104. In some embodiments, a portion of the first groove 110 forms the first side edge 106 and a portion of the second groove 112 forms the second side edge 108. In some other embodiments, the first groove 110 is provided inward of the first side edge 106 and the second groove 112 is provided inward of the second side edge 108. The first groove 110 includes a first proximate end 114 and an opposite first distal end 116. Similarly, the second groove 112 includes a second proximate end 118 and an opposite second distal end 120.

In some embodiments, a plurality of pairs of first projections 111 extend outwardly along at least a portion of the length of the first groove 110 and a plurality of pairs of second projections 113 extend outwardly along at least a portion of the length of the second groove 112.

A first attachment portion 122 is provided at the first proximate end 114 of the first groove 110. The first attachment portion 122 may include a first cavity 124 having a first end wall 126. The first end wall 126 includes a first slot 128. A second attachment portion 130 is provided at the second proximate end 118 of the second groove 112. The second attachment portion 130 may include a second cavity 132 having a second end wall 134. The second end wall 134 includes a second slot 136. As will be described in greater detail below, the first attachment portion 122 and the second attachment portion 130 are configured to mount a portion of the light emitting assembly 35 to the support frame 36.

Referring to FIGS. 4A and 4B, the support frame includes a first hook 138 and a second hook 140. The first hook 138 may be provided at the first distal end 116 of the first groove 110. The second hook 140 may be provided at the second distal end 120 of the second groove 112.

Figure 5A:
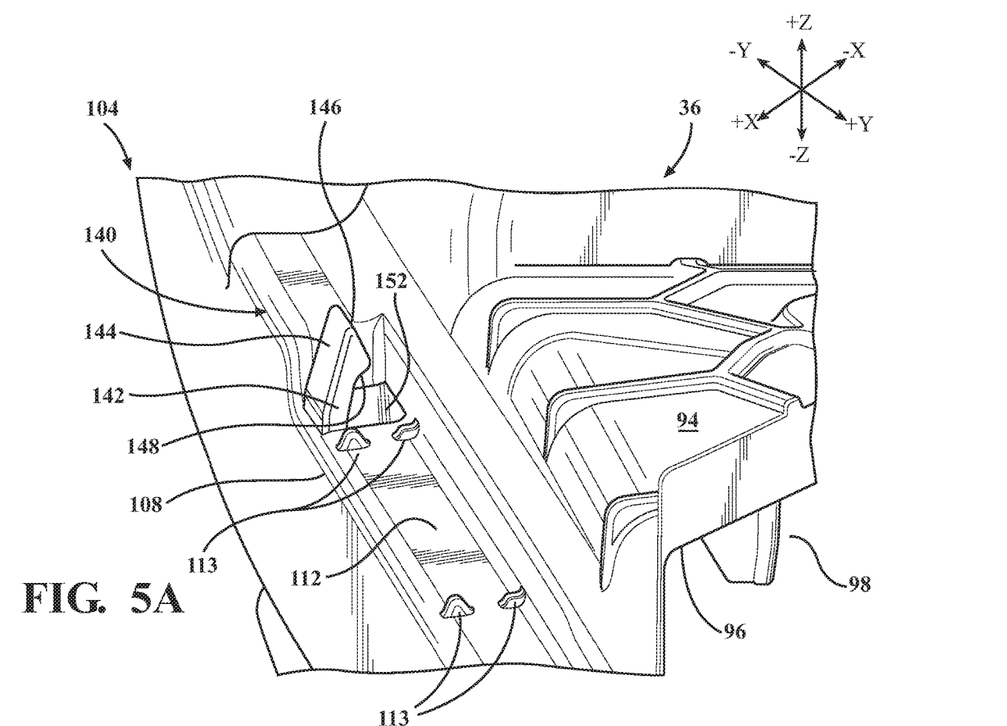
FIG. 5A schematically depicts a partial perspective view of the support frame, without the light emitting assembly, of the cup holder assembly of FIG. 2 in isolation, according to one or more embodiments described and illustrated herein.
Figure 5B:
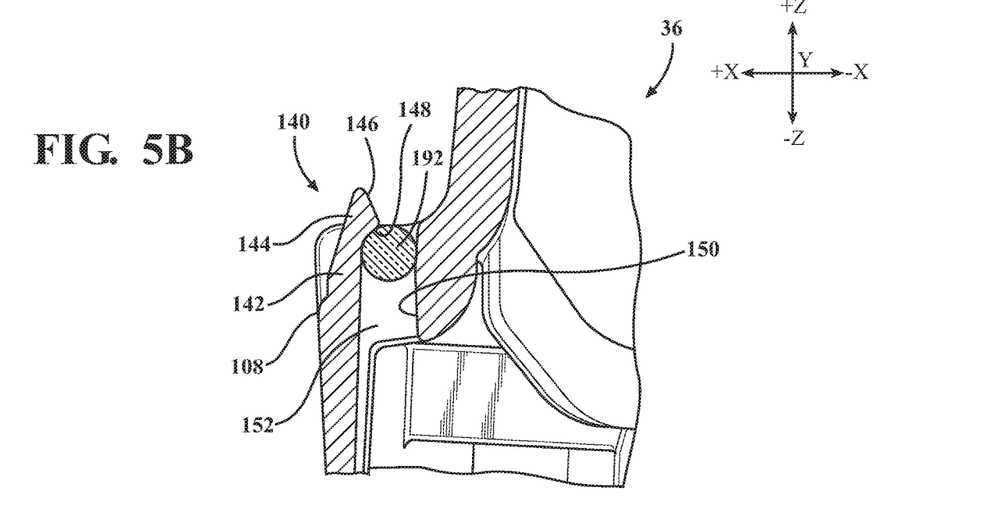
FIG. 5B schematically depicts a partial cross section of a front view of the support frame and the light emitting assembly of the cup holder assembly taken along line 5-5 of FIG. 4B, according to one or more embodiments described and illustrated herein.

With reference to FIGS. 5A and 5B, the second hook 140 will be described in greater detail. The second hook 140 includes an extension 142 and a tab 144. The extension 142 extends outwardly from the upper surface 94 of the support frame 36. The extension 142 may be provided at the second side edge 108 of the support frame 36. In some other embodiments, the extension 142 is provided adjacent and inwardly of the second side edge 108.

The tab 144 is provided at an end of the extension 142 opposite the upper surface 94 of the support frame 36. The tab 144 includes a tapered surface 146 and a contact surface 148. The tapered surface 146 tapers outwardly as the tapered surface 146 extends downwardly in the vehicle vertical direction. The contact surface 148 is formed as an undercut from the tapered surface 146 and extends inwardly as the contact surface 148 extends downwardly in the vehicle vertical direction.

The support frame 36 further includes an abutment surface 150 provided inwardly from the extension 142 of the second hook 140. The abutment surface 150 may extend parallel with the extension 142. In some embodiments, a slit 152 is formed between the extension 142 of the second hook 140 and the abutment surface 150. The slit 152 may be formed during the molding of the support frame 36. The abutment surface 150 and the slit 152 may be provided at the second distal end 120 of the second groove 112.

It is appreciated, of course, that the first hook 138 and the second hook 140 are mirror images of each other such that the first hook 138 includes the structure of the second hook 140 and a corresponding abutment surface 150 and slit 152 formed adjacent the first distal end 116. As will be described in greater detail below, the first hook 138 and the second hook 140 are configured to mount a portion of the light emitting assembly 35 to the support frame 36.

Referring to FIGS. 3 and 4B, the light emitting assembly 35 will be discussed in greater detail. The light emitting assembly 35 includes a first light emitting assembly 35A and a second light emitting assembly 35B. The first light emitting assembly 35A includes a first light source 154 and a first light emitting element 156. The second light emitting assembly 35B includes a second light source 158 and a second light emitting element 160.

It is appreciated, of course, that the first light emitting assembly 35A and the second light emitting assembly 35B are mirror images of each other such that the first light emitting assembly 35A includes the structure of the second light emitting assembly 35B.

The first light source 154 and the second light source 158 may be, without limitation, LED modules or light bulbs. The first light source 154 includes a first body 162, a first lens 164, and a first protrusion 166. The second light source 158 includes a second body 168, a second lens 170, and a second protrusion 172. The first body 162 and the second body 168 are connected to a wire harness (not shown) to power the first light source 154 and the second light source 158, respectively.

The first lens 164 and the second lens 170 extend outwardly away from the first body 162 and the second body 168, respectively. The first protrusion 166 includes a first trunk portion 174 and a first arm portion 176. The second protrusion 172 includes a second trunk portion 178 and a second arm portion 180. The first trunk portion 174 and the second trunk portion 178 extend outwardly from the first body 162 and the second body 168, respectively. In some embodiments, the first trunk portion 174 and the second trunk portion 178 extend in a longitudinal direction of the first body 162 and the second body 168, respectively.

The first arm portion 176 and the second arm portion 180 extend outwardly from the first trunk portion 174 and the second trunk portion 178, respectively. The first arm portion 176 and the second arm portion 180 may extend generally normal from ends of the first trunk portion 174 and the second trunk portion 178, respectively, such that the first protrusion 166 and the second protrusion 172 have a generally T-shaped cross-section.

The first light emitting element 156 and the second light emitting element 160 may be, without limitation, light pipes, light tubes, or other light diffusion elements that distribute light over its length for equidistribution along an entire length or control light distribution over a portion of the entire length.

The first light emitting element 156 includes a first light receiving face 182 and a first light emitting face 184. The second light emitting element 160 includes a second light receiving face 186 and a second light emitting face 188. The first light emitting element 156 includes a first connection portion 190 opposite the first light receiving face 182. The second light emitting element 160 includes a second connection portion 192 opposite the second light receiving face 186.

In some embodiments, the first light emitting element 156 and the second light emitting element 160 are formed as elongated members. The first light emitting element 156 and the second light emitting element 160 may be formed having a cross section that varies in shape along an entire length of the first light emitting element 156 and the second light emitting element 160. In some other embodiments, portions of the first light emitting element 156 and the second light emitting element 160 curve inwardly adjacent the first light receiving face 182 and the second light receiving face 186. In some other embodiments, portions of the first light emitting element 156 and the second light emitting element 160 curve outwardly adjacent the first connection portion 190 and the second connection portion 192.

The first connection portion 190 and the second connection portion 192 may be provided with a cross sectional shape that corresponds to the shape of the contact surface 148 of the tabs 144. In some embodiments, the first connection portion 190 and the second connection portion 192 may be provided with a generally circular cross sectional shape.

In some embodiments, the first light emitting face 184 and the second light emitting face 188 are formed as planar faces. The first light emitting face 184 and the second light emitting face 188 may include first striations 194 and second striations 196, respectively. The first striations 194 and the second striations 196 facilitate the distribution of light across the first light emitting face 184 and the second light emitting face 188, respectively.

In some embodiments, the first light emitting face 184 and the second light emitting face 188 extend along a portion of the first light emitting element 156 and the second light emitting element 160. The first light emitting element 156 may include a first light receiving portion 183 and the second light emitting element 160 may include a second light receiving portion 187. The first light receiving portion 183 may be positioned between the first light receiving face 182 and the first light emitting face 184. The second light receiving portion 187 may be positioned between the second light receiving face 186 and the second light emitting face 188. In some embodiments, the first light emitting element 156 and the second light emitting element 160 may be configured such that only the first light emitting face 184 and the second light emitting face 188 emit light.

Referring to FIGS. 4A, 5A, and 5B, the connection of the light emitting assembly 35 to the support frame 36 will be discussed in greater detail. The first light source 154 and the second light source 158 are mounted to the first attachment portion 122 and the second attachment portion 130, respectively.

The first light source 154 may be mounted to the support frame 36 such that the first trunk portion 174 is received within the first slot 128 of the first attachment portion 122 and the first arm portion 176 is provided on one side of the first end wall 126 and the first body 162 is provided on the other side of the first end wall 126. The second light source 158 may be mounted to the support frame 36 such that the second trunk portion 178 is received within the second slot 136 of the second attachment portion 130 and the second arm portion 180 is provided on one side of the second end wall 134 and the second body 168 is provided on the other side of the second end wall 134.

The first light emitting element 156 may be mounted to the support frame 36 such that the first light receiving face 182 is at least partially received within the first cavity 124 of the first attachment portion 122. The second light emitting element 160 may be mounted to the support frame 36 such that the second light receiving face 186 is at least partially received within the second cavity 132 of the second attachment portion 130. The first light emitting element 156 is positioned with respect to the first lens 164 so as to efficiently collect and direct light through the first light emitting element 156. The second light emitting element 160 is positioned with respect to the second lens 170 so as to efficiently collect and direct light through the second light emitting element 160.

In some embodiments, the first light receiving face 182 is in contact with the first lens 164 of the first light source 154 and the second light receiving face 186 is in contact with the second lens 170 of the second light source 158. The contact between the first light receiving face 182 and the second light receiving face 186 with the first lens 164 and the second lens 170, respectively, reduces the amount of light leakage between the first light source 154 and the second light source 158 and the first light emitting element 156 and the second light emitting element 160, respectively.

The first connection portion 190 and the second connection portion 192 are engaged within the first hook 138 and the second hook 140, respectively. With references to FIG. 5B, the contact surface 148 of the first hook 138 and the second hook 140 retains the first connection portion 190 and the second connection portion 192 to the support frame 36. In some embodiments, the shape of the first connection portion 190 and the second connection portion 192 corresponds to the shape of the contact surface 148. The first connection portion 190 and the second connection portion 192 are retained in a snap fit or friction engagement between the abutment surface 150 and the extension 142.

The first light emitting element 156 and the second light emitting element 160 are received within the first groove 110 and the second groove 112. In some embodiments, the first light emitting element 156 is positioned between the plurality of pairs of first projections 111 to retain the position of the first light emitting face 184. In some embodiments, the second light emitting element 160 is positioned between the plurality of pairs of second projections 113 to retain the position of the second light emitting face 188.

As the first light emitting element 156 is connected to the support frame 36 by the first light receiving face 182 being at least partially positioned within the first cavity 124 and the engagement of the first connection portion 190 with the first hook 138, the first light emitting face 184 is continuously exposed along the entire length of the first light emitting face 184. Similarly, as the second light emitting element 160 is connected to the support frame 36 by the second light receiving face 186 being at least partially positioned within the second cavity 132 and the engagement of the second connection portion 192 with the second hook 140, the second light emitting face 188 is continuously exposed along the entire length of the second light emitting face 188.

Referring to FIG. 6, the connection of the cover 32, the housing 34, the light emitting assembly 35, and the support frame 36, will now be discussed in detail. The housings 34 are connected to the interior surface 40 of the cover 32. In some embodiments, the housings 34 are connected to the interior surface 40 of the cover 32 by arranging the connection posts 44 to extend through the bores 76 and the attachment bores 80 of the flanges 70 and the attachment flange 78. In some other embodiments, the housings 34 are connected to the interior surface 40 of the cover 32 by additional fasteners (not shown).

In some other embodiments, the housing 34 is connected to the support frame 36 prior to connection of the support frame 36 to the cover 32. The housing 34 may be connected to the support frame 36 by inserting the open ended receptacles 62 into the apertures 98 of the support frame 36. As the flanges 70 and the attachment flange 78 extend outwardly from the upper edge 64 of the open ended receptacles 62, the housings 34 may be retained within the support frame 36 by the contact of the lower surfaces 74 of the flanges 70 against the upper surface 94 of the support frame 36. Upon connection of the housing 34 to the support frame 36 and the mounting of the light emitting assembly 35 to the support frame 36, the support frame 36 is connected to the cover 32.

The support frame 36, having the light emitting assembly 35 mounted thereon, is connected to at least one of the cover 32 and the housing 34. Specifically, the holes 100 of the support frame 36 are arranged to correspond to the bores 76, the attachment bores 80, and the internal bores 46 of the connection posts 44 of the cover 32. Fasteners 200 secure the support frame 36 to the cover 32 and the housing 34, with the housing 34 being positioned between the upper surface 94 of the support frame 36 and the interior surface 40 of the cover 32. Specifically, fasteners 200 extend through the holes 100 of the support frame 36, the bores 76, the attachment bores 80, and the internal bores 46 of the connection posts 44. The connection of the fasteners 200 to the internal bores 46 of the connection posts 44 connects the cover 32, the housing 34, and the support frame 36.

In some embodiments, the first distal edge 56 of the first lip 52 contacts a portion of the first light emitting element 156 along the first light emitting face 184. In some other embodiments, a portion of the wrap 60 provided around the first distal edge 56 of the first lip 52 contacts a portion of the first light emitting element 156 along the first light emitting face 184. The contact between the cover 32 and the first light emitting element 156 retains the position of the first light emitting element 156 as the first light emitting element 156 may only be connected to the support frame 36 by the first light receiving face 182 being at least partially positioned within the first cavity 124 and the engagement of the first connection portion 190 with the first hook 138.

In some embodiments, the second distal end 58 of the second lip 54 contacts a portion of the second light emitting element 160 along the second light emitting face 188. In some other embodiments, a portion of the wrap 60 provided around the second distal end 58 of the second lip 54 contacts a portion of the second light emitting element 160 along the second light emitting face 188. The contact between the cover 32 and the second light emitting element 160 retains the position of the second light emitting element 160 as the second light emitting element 160 may only be connected to the support frame 36 by the second light receiving face 186 being at least partially positioned within the second cavity 132 and the engagement of the second connection portion 192 with the second hook 140.

The first light emitting assembly 35A and the second light emitting assembly 35B are activated upon the activation of the first light source 154 and the second light source 158. Specifically, upon activation of the first light source 154 and the second light source 158, light is emitted from the first lens 164 and the second lens 170, respectively.

The light emitted from the first lens 164 of the first light source 154 is received and collected by the first light receiving face 182. The light received and collected by the first light receiving face 182 is directed through the first light receiving portion 183 and towards the first light emitting face 184. The light L is then emitted from the first light emitting element 156 through the first light emitting face 184. The first striations 194 along the first light emitting face 184 may facilitate the equidistribution of the light L along the entire length of the first light emitting face 184.

Similarly, the light emitted from the second lens 170 of the second light source 158 is received and collected by the second light receiving face 186. The light received by the second light receiving face 186 is directed through the second light receiving portion 187 and towards the second light emitting face 188. The light L is then emitted from the second light emitting element 160 through the second light emitting face 188. The second striations 196 along the second light emitting face 188 may facilitate the equidistribution of the light L along the entire length of the second light emitting face 188.

Referring to FIGS. 1 and 6, the cup holder assembly 30 is provided with the light emitting assembly 35 to illuminate an exterior of the cup holder assembly 30. Specifically, the light emitting assembly 35 illuminates the exterior of the cup holder assembly 30 such that the light L is emitted outwardly away from the cup holder assembly 30 in the vehicle lateral direction. The light L emitted outwardly away from light emitting assembly 35 of the cup holder assembly 30, in the vehicle lateral direction, at least partially illuminates a portion of the passenger compartment 12. Specifically, the light L emitted from the light emitting assembly 35 illuminates a least a portion of the driver seat 22 and the front passenger seat 24.

As the first light emitting assembly 35A and the second light emitting assembly 35B are positioned between the interior surface 40 of the cover 32 and the upper surface 94 of the support frame 36, the first light emitting assembly 35A and the second light emitting assembly 35B are oriented to emit light L outwardly away from the exterior surface 38 of the cover 32. Specifically, the first light emitting assembly 35A and the second light emitting assembly 35B are oriented such that the light L from the first light emitting face 184 and the second light emitting face 188 is emitted outwardly away from the outer surfaces 28A of the pair of side curtain walls 28.

The positioning of the first light emitting element 156 and the second light emitting element 160 between the first side edge 106 and the second side edge 108, respectively, orients the first light emitting face 184 and the second light emitting face 188 to emit light L outwardly away, in the vehicle lateral direction, from the first lip 52 and the second lip 54, respectively. Specifically, the first light emitting face 184 and the second light emitting face 188 are oriented to emit light L outwardly away, in the vehicle lateral direction, from the exterior surface 38 of first lip 52 and the second lip 54.

As the first light emitting face 184 is continuously exposed along the entire length of the first light emitting face 184, the light L is emitted outward, in the vehicle lateral direction, continuously along the entire length of the first light emitting face 184. Similarly, as the second light emitting face 188 is continuously exposed along the entire length of the second light emitting face 188, the light L is emitted outward, in the vehicle lateral direction, continuously along the entire length of the second light emitting face 188.

The above described console assemblies provide cup holder assemblies that are configured to be used in vehicles with or without lighting features, such as light emitting assemblies. As the outwardly appearance of the cup holder assembly is the same with or without the light emitting assembly, as shown in FIG. 2, the cup holder assembly can be used in vehicles with and without the lighting feature.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cup holder assembly for a console assembly of a vehicle, the cup holder assembly comprising:
   a cover having an exterior surface, an opposite interior surface, an opening extending between the exterior surface and the interior surface;
   a housing having an open ended receptacle, the housing is connected to the cover such that the opening permits access to the open ended receptacle;
   a support frame having an aperture configured to receive a portion of the open ended receptacle, the support frame connected to at least one of the cover and the housing such that a portion of the housing is positioned between the interior surface of the cover and support frame; and
   a light emitting assembly positioned between the interior surface of the cover and the support frame, the light emitting assembly being oriented to emit light outwardly away from the exterior surface of the cover.

2. The cup holder assembly of claim 1 further comprising:
   a pair of side curtain walls, each of the side curtain walls having an inner surface and an opposite outer surface, at least a portion of the housing is positioned between the inner surfaces of the pair of side curtain walls, and the light emitting assembly being oriented to emit light outwardly away from the outer surface of the side curtain walls.

3. The cup holder assembly of claim 2, wherein the light emitting assembly includes a first light emitting element, a second light emitting element, a first light source, and a second light source, the first light emitting element includes a first light receiving face and a first light emitting face, the second light emitting element includes a second light receiving face and a second light emitting face,
   the first light receiving face positioned to receive light emitted from the first light source and the first light emitting face configured to emit light received from the first light receiving face outwardly away from the outer surface of one of the pair of side curtain walls,
   the second light receiving face positioned to receive light emitted from the second light source, and the second light emitting face configured to emit light received from the second light receiving face away from the outer surface of the other of the pair of side curtain walls.

4. The cup holder assembly of claim 3, wherein the cover includes a first lip and an opposite second lip, and the support frame includes a first side edge and an opposite second side edge,
   wherein the first light emitting element is positioned between the first side edge of the support frame and the first lip of the cover such that the first light emitting face emits light outwardly away from the first side edge of the support frame and the first lip of the cover,
   wherein the second light emitting element is positioned between the second side edge of the support frame and the second lip of the cover such that the second light emitting face emits light outwardly away from the second side edge of the support frame and the second lip of the cover.

5. The cup holder assembly of claim 4, wherein the support frame includes a first end portion, an opposite second end portion, a first groove, and a second groove, the first groove extends along the support frame adjacent the first side edge from the first end portion towards the second end portion, the second groove extends along the support frame adjacent the second side edge from the first end portion towards the second end portion, and
wherein the first light emitting element is received within the first groove and the second light emitting element is received within the second groove.

6. The cup holder assembly of claim 5, wherein the first groove includes a first proximate end and an opposite first distal end, and the second groove includes a second proximate end and an opposite second distal end, a first hook is positioned adjacent the first distal end of the first groove and a second hook is positioned adjacent the second distal end of the second groove,
wherein the first light emitting element includes a first connection portion opposite the first light receiving face and the second light emitting element includes a second connection portion opposite the second light receiving face, and
wherein the first hook secures the first connection portion of the first light emitting element to the support frame and the second hook secures the second connection portion of the second light emitting element to the support frame.

7. The cup holder assembly of claim 6, wherein the first light source is mounted adjacent to the first proximate end of the support frame and the second light source is mounted adjacent to the second proximate end of the support frame.

8. A cup holder assembly for a console assembly of a vehicle the cup holder assembly comprising:
a cover having an exterior surface, an opposite interior surface, an opening extending between the exterior surface and the interior surface, a first lip and an opposite second lip;
a housing having an open ended receptacle, the housing is connected to the cover such that the opening permits access to the open ended receptacle;
a support frame connected to at least one of the cover and the housing, the support frame having a first side edge and a second side edge;
a first light emitting assembly having a first light emitting element positioned between the first lip of the cover and the first side edge of the support frame, the first light emitting element being oriented to emit light outwardly away from the first side edge of the support frame and the first lip of the cover; and
a second light emitting assembly having a second light emitting element positioned between the second lip of the cover and the second side edge of the support frame, the second light emitting element being oriented to emit light outwardly away from the second lip of the cover and the second side edge of the support frame.

9. The cup holder assembly of claim 8 further comprising:
a pair of side curtain walls, each of the side curtain walls having an inner surface and an opposite outer surface, at least a portion of the housing is positioned between the inner surfaces of the pair of side curtain walls, and the first light emitting element being oriented to emit light outwardly away from one of the pair of outer surface of the side curtain walls and the second light emitting element being oriented to emit light outwardly away from the outer surface of the other of the pair of side curtain walls.

10. The cup holder assembly of claim 9, wherein the first light emitting assembly includes a first light source, and the first light emitting element includes a first light receiving face and a first light emitting face, and wherein the second light emitting assembly includes a second light source, and the second light emitting element includes a second light receiving face and a second light emitting face,
the first light receiving face positioned to receive light emitted from the first light source and the first light emitting face configured to emit light received from the first light receiving face outwardly away from the outer surface of one of the pair of side curtain walls,
the second light receiving face positioned to receive light emitted from the second light source, and the second light emitting face configured to emit light received from the second light receiving face outwardly away from the outer surface of the other of the pair of side curtain walls.

11. The cup holder assembly of claim 10,
wherein the first light emitting element is positioned between the first side edge of the support frame and the first lip of the cover such that the first light emitting face emits light outwardly away from the first side edge of the support frame and the first lip of the cover,
wherein the second light emitting element is positioned between the second side edge of the support frame and the second lip of the cover such that the second light emitting face emits light outwardly away from the second side edge of the support frame and the second lip of the cover.

12. The cup holder assembly of claim 11, wherein the support frame includes a first end portion, an opposite second end portion, a first groove, and a second groove, the first groove extends along the support frame adjacent the first side edge from the first end portion towards the second end portion, the second groove extends along the support frame adjacent the second side edge from the first end portion towards the second end portion, and
wherein the first light emitting element is received within the first groove and the second light emitting element is received within the second groove.

13. The cup holder assembly of claim 12, wherein the first groove includes a first proximate end and an opposite first distal end, and the second groove includes a second proximate end and an opposite second distal end, a first hook is positioned adjacent the first distal end of the first groove and a second hook is positioned adjacent the second distal end of the second groove,
wherein the first light emitting element includes a first connection portion opposite the first light receiving face and the second light emitting element includes a second connection portion opposite the second light receiving face, and
wherein the first hook secures the first connection portion of the first light emitting element to the support frame and the second hook secures the second connection portion of the second light emitting element to the support frame.

14. The cup holder assembly of claim 13, wherein the first light source is mounted adjacent to the first proximate end of the support frame and the second light source is mounted adjacent to the second proximate end of the support frame.

15. A method of illuminating an exterior of a cup holder assembly for a console assembly of a vehicle, the method comprising:
providing a cover having an exterior surface, an opposite interior surface, an opening extending between the exterior surface and the interior surface, a first lip and an opposite second lip;
providing a housing having an open ended receptacle, the housing is connected to the cover such that the opening permits access to the open ended receptacle;

providing a support frame connected to at least one of the cover and the housing, the support from having a first side edge and a second side edge;

providing a first light emitting assembly having a first light emitting element positioned between the first lip of the cover and the first side edge of the support frame, the first light emitting element being oriented to emit light outwardly away from the first side edge of the support frame and the first lip of the cover; and providing a second light emitting assembly having a second light emitting element positioned between the second lip of the cover and the second side edge of the support frame, the second light emitting element being oriented to emit light outwardly away from the second lip of the cover and the second side edge of the support frame.

16. The method of claim 15, wherein the light emitting assembly includes a first light source, and the first light emitting element includes a first light receiving face and a first light emitting face, and wherein the second light emitting assembly includes a second light source, and the second light emitting element includes a second light receiving face and a second light emitting face, the first light receiving face positioned to receive light emitted from the first light source and the first light emitting face configured to emit light received from the first light receiving face outwardly away from the exterior surface of the cover, the second light receiving face positioned to receive light emitted from the second light source, and the second light emitting face configured to emit light received from the second light receiving face outwardly away from the exterior surface of the cover.

17. The method of claim 16, wherein the first light emitting element is positioned between the first side edge of the support frame and the first lip of the cover such that the first light emitting face emits light outwardly away from the first side edge of the support frame and the first lip of the cover, wherein the second light emitting element is positioned between the second side edge of the support frame and the second lip of the cover such that the second light emitting face emits light outwardly away from the second side edge of the support frame and the second lip of the cover.

18. The method of claim 17, wherein the support frame includes a first end portion, an opposite second end portion, a first groove, and a second groove, the first groove extends along the support frame adjacent the first side edge from the first end portion towards the second end portion, the second groove extends along the support frame adjacent the second side edge from the first end portion towards the second end portion, and wherein the first light emitting element is received within the first groove and the second light emitting element is received within the second groove.

19. The method of claim 18, wherein the first groove includes a first proximate end and an opposite first distal end, and the second groove includes a second proximate end and an opposite second distal end, a first hook is positioned adjacent the first distal end of the first groove and a second hook is positioned adjacent the second distal end of the second groove, wherein the first light emitting element includes a first connection portion opposite the first light receiving face and the second light emitting element includes a second connection portion opposite the second light receiving face, and wherein the first hook secures the first connection portion of the first light emitting element to the support frame and the second hook secures the second connection portion of the second light emitting element to the support frame.

20. The method of claim 19, wherein the first light source is mounted adjacent to the first proximate end of the support frame and the second light source is mounted adjacent to the second proximate end of the support frame.

* * * * *

UNITED STATES PATENT AND TRADEMARK OFFICE
CERTIFICATE OF CORRECTION

| | |
|---|---|
| PATENT NO. | : 10,315,561 B2 |
| APPLICATION NO. | : 15/653951 |
| DATED | : June 11, 2019 |
| INVENTOR(S) | : Robert A. Porcs and Chae An |

Page 1 of 1

It is certified that error appears in the above-identified patent and that said Letters Patent is hereby corrected as shown below:

In the Claims

In Column 15, Line 29, Claim 8, after "vehicle" insert --,--, therefor.

Signed and Sealed this
Twenty-third Day of July, 2019

Andrei Iancu
*Director of the United States Patent and Trademark Office*